Dec. 20, 1966 D. SCARAMUCCI 3,292,653
FOLDABLE CHECK VALVE
Filed Feb. 10, 1964 2 Sheets-Sheet 1
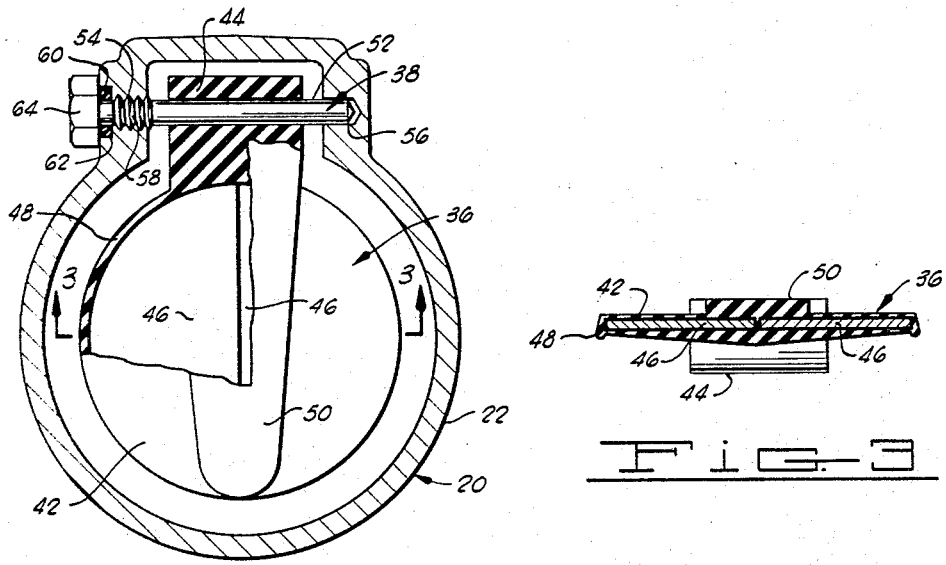
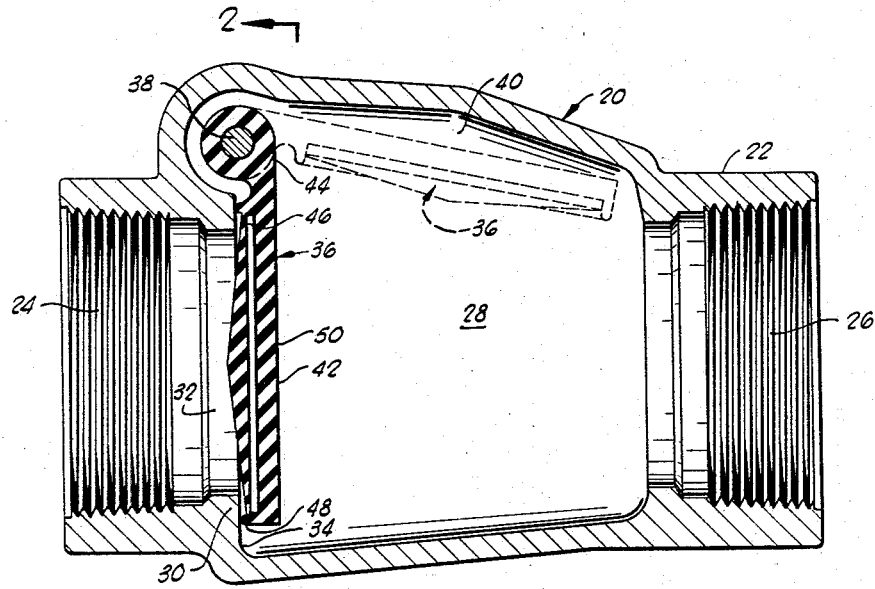
INVENTOR.
DOMER SCARAMUCCI
BY
Dunlap & Laney
ATTORNEYS Dec. 20, 1966  D. SCARAMUCCI  3,292,653
FOLDABLE CHECK VALVE
Filed Feb. 10, 1964  2 Sheets-Sheet 2

INVENTOR.
DOMER SCARAMUCCI
BY
Dunlap & Laney
ATTORNEYS

United States Patent Office 3,292,653
Patented Dec. 20, 1966

3,292,653
FOLDABLE CHECK VALVE
Domer Scaramucci, 3245 S. Hattie,
Oklahoma City, Okla. 73001
Filed Feb. 10, 1964, Ser. No. 343,531
5 Claims. (Cl. 137—315)

This invention relates generally to improved check valves useful in fluid circuits to permit fluid flow in one direction while preventing fluid flow in the opposite direction. More particularly, but not by way of limitation, this invention relates to an improved check valve providing a flow passage therethrough at least equal in cross-sectional area to the conduit to which the valve is attached.

Generally speaking, the method utilized in constructing flapper type check valves in the past has necessitated the provision of a rather large opening which is temporarily closed by a removable bonnet. The opening is provided so that the flapper or valve closure member can be installed in and removed from the valve. In the instance of a full bore valve, i.e., one in which the flow passage through the valve is at least as large as the conduit to which the valve is attached, the opening covered by the bonnet is necessarily as large as the flapper and larger than any other opening in the valve.

The necessity of providing such a large opening has introduced several problems. First, the entire structure was weakened. Second, to overcome this weakness, the valve body was made disproportionately heavy. Third, the overall dimensions of the valve were larger than necessary. Fourth, and by all means not the least of the problems, was the difficulty encountered in providing adequate sealing around the bonnet opening.

Various structural arrangements of check valves have been devised in the past to eliminate the bonnet opening. It is important to note, however, that none of these have been successful in providing a check valve incorporating a full bore wherein maximum flow and minimum resistance thereto can be attained. This is particularly true when the service in which the valve is used involves substantial pressure differentials across the valve. Most of the valves so constructed have some structural portion thereof infringing upon the flow area. Generally, such structural portion comprises part of the mounting of the flapper or valve member in the valve body.

The check valve of the present invention includes a reinforced valve member pivotally mounted in a valve body in such a manner that the valve member is adapted to sealingly engage a seat in the body to close an aperture extending through the seat. While a valve constructed in accordance with the instant invention requires no bonnet opening, the valve is of the full bore type. The elimination of the bonnet opening can be accomplished because the reinforcing in the valve member is split, permitting the valve member to be folded and inserted through the outlet end of the valve.

It is, therefore, one object of the invention to provide an improved check valve having a full fluid flow bore, but eliminating the bonnet opening.

Another object of the invention is to provide an improved check valve that can be easily and economically manufactured.

One other object of the invention is to provide an improved check valve having a valve member incorporating an improved seal structure that will provide effective closure of the aperture at both low and high fluid pressure.

Still another object of the invention is to provide an improved check valve which can be readily assembled and disassembled with ordinary hand tools in even the largest valve sizes.

A further object of the invention is to provide an improved check valve which alleviates leakage problems encountered in the present construction of some full bore valves.

A still further object of the invention is to provide an improved valve member that will operate in a check valve to withstand relatively high pressures, yet can be folded for insertion into the valve.

The foregoing and additional objects and advantages of the invention will become more evident as the following description is read in conjunction with the accompanying drawings wherein like reference characters denote like parts in all views, and wherein:

FIG. 1 is a cross-sectional view of a check valve constructed in accordance with the invention;

FIG. 2 is a transverse cross-sectional view of the check valve shown in FIG. 1 taken along the line 2—2 of FIG. 1;

FIG. 3 is a cross-sectional view of a flapper member utilized in the check valve taken along the line 3—3 of FIG. 2;

Figure 4:
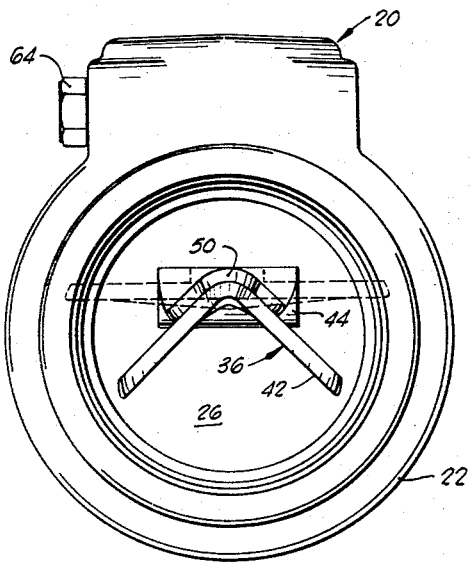
FIG. 4 is an end elevation view of the check valve shown in FIG. 1, showing the flapper member folded and partially inserted in one end of the check valve.

Referring now to the drawings, and to FIG. 1 in particular, shown therein is a check valve which is generally designated by the reference character 20. The check valve 20 includes a valve body 22 having an inlet 24 and an outlet 26 which are internally threaded or otherwise suitably adapted to be connected to sections of a conduit (not shown). The inlet 24 and outlet 26 communicate with the opposite ends of an enlarged valve chamber 28. An annular valve seat 30 encircles the inlet 24 adjacent the valve chamber 28. As illustrated, the valve seat 30 is annular in form and defines a fluid flow aperture 32. In the most desirable form of check valve 20, the fluid flow aperture 32 will have a cross-sectional area at least equal to the cross-sectional area of the outlet 26 of the check valve 20. Such a large area is provided in the flow aperture 32 so that the check valve 20 will provide a minimum restriction to fluid flow therethrough. A seating surface 34 is provided on the outlet side of the seat 30 and is adapted to be sealingly engaged by a valve member 36. The valve member 36 is pivotally supported in the valve chamber 28 on a hinge pin 38. The valve member 36 pivots out of the path of fluid flow into an upper portion 40 of the valve chamber 28, as shown in dash lines in FIG. 1.

As can best be seen in FIGS. 2 and 3, the valve member 36 includes a seal portion 42 and a hinge portion 44. In the preferred form, the valve member 36 is constructed primarily from a resilient material which substantially encompasses the seal portion 42 and extends therefrom to form the hinge portion 44. Located within the seal portion 42 are a pair of reinforcing plate members 46 which may be seen in elevation in FIG. 2 and in cross-section in FIG. 3. The reinforcing members 46 are preferably segmental in shape and are so disposed that the chords of each segment are adjacent. A portion of the resilient material encompassing the reinforcing members 46 extends about the composite periphery of the reinforcing members 46 and projects therefrom toward the inlet 24 of the check valve 20 (FIG. 1) to form a pressure responsive bead 48. The pressure responsive bead 48 projects a sufficient distance past the inlet side of the reinforcing members 46 to assure that the bead 48 will engage the surface 34 of the seat 30 prior to the engagement thereof by the reinforcing members 46. A backing strip 50 is clearly shown in FIG. 2 and extends across the seal portion 42 of the valve member 36 generally along and adjacent to the chords of the reinforcing members 46. The purpose of the backing strip 50 will be explained more fully in connection with the description of FIG. 4.

FIG. 2 illustrates one method of pivotally supporting the valve member 36 in the valve body 22. As shown therein, the hinge pin 38 has a smooth shank 52 and extends through a threaded bore 54 in the valve body 22; upper portion 40 of the chamber 28; through the hinge portion 44 of the valve member 36; and into a counterbore 56 formed in the opposite side of the valve body 22. Mating threads 58 are provided on the hinge pin 38 for engagement with the threaded bore 54 to retain the hinge pin 38 in the valve body 22. Leakage around the hinge pin 38 to the outside of the valve body 22 is prevented by an O-ring 60 located in a counterbore 62 in the threaded bore 54. The arrangement of the O-ring 60 in the counterbore 62 is such that when the hinge pin 38 is screwed into the valve body 22, a head 64 located on the end of the hinge pin 38 will compress the O-ring 60 in the counterbore 62 to form a fluid tight seal therewith.

The folding characteristic of the valve member 36 permits the manufacture of the check valve 20 without necessitating a bonnet opening such as is prevalent in most of the full bore valves currently available. FIG. 4 shows an end view of the check valve 20. As shown therein, the valve member 36 is illustrated in its planar form by dash lines superimposed over the end view of the check valve 20. As can be seen, the valve member 36 is considerably larger in width than the opening in the valve 20 through which the valve member 36 must be inserted to install the valve member 36 in the check valve 20. The importance of the segmental reinforcing members 46 becomes very apparent upon observation of FIG. 4. As shown in solid lines, the valve member 36 has been folded along the line defined by the chords of the segmental reinforcing members 46 so that the overall dimensions thereof are sufficiently small to permit the valve member 36 to pass through the outlet 26 of the check valve 20.

Assembly of the check valve 20 is accomplished by folding the valve member 36 as previously described and inserting the same through the outlet 26 of the check valve 20. When the valve member 36 reaches the enlarged chamber 28, the valve member returns to its planar form as shown in FIG. 2. The valve member 36 is then held against the surface 34 of the seat 30 and the hinge pin 38 (with the O-ring 60 thereon) is inserted through the threaded bore 54, through the hinge portion 44 of the valve member 36, and into the counterbore 56 in the opposite side of the valve body 22. The mating threads 58 on the hinge pin 38 and in the bore 54 are engaged and the hinge pin 38 tightened to securely retain the valve member 36 in the check valve 20. The foregoing assembly can be accomplished with ordinary hand tools. All that is required is a small wrench to tighten or loosen the hinge pin 38. Presently available full bore valves require either a very large or a special wrench to remove the bonnet cover so that the valve member can be inserted into the valve body.

The backing strip 50 serves several important functions in the construction and operation of the check valve 20. As may be clearly seen in FIG. 4, the valve member 36 is folded away from the backing strip 50 which, due to its relatively thick section of resilient material, eliminates any possibility of separation of the resilient material along the adjacent chords of the reinforcing members 46. Once the valve member 36 is in the chamber 28, the backing strip 50 provides a biasing force to return the folded seal portion 42 of the valve member 36 to a generally planar configuration as shown in FIGS. 1 and 2.

It should also be pointed out that during the molding operation in which the valve member 36 is formed, a small separation may occur between the reinforcing members 46 (see FIG. 3) so that some resilient material may enter therebetween. Under such circumstances, the valve member would be weakened to some extent due to the possibility of pressure extruding the resilient material from between the adjacent chords of the reinforcing members 46. Due to the increased thickness of the resilient material in the backing strip 50, the imposition of a small amount of resilient material between the reinforcing members 46 will not affect the strength of the valve member 36 even when subjected to extremely high pressures.

Figure 5:
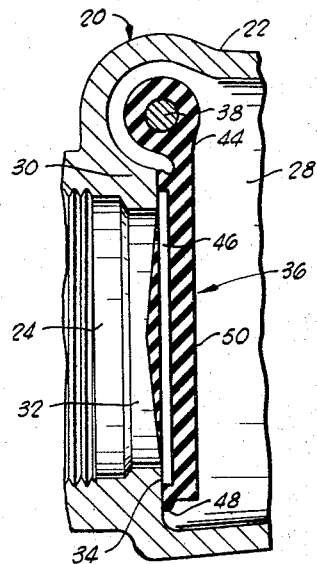
FIG. 5 is a partial cross-sectional view of the check valve showing the valve member with pressure applied thereto.

With the check valve 20 assembled and installed in a fluid handling system (not shown), fluid flowing through the inlet 24 of the check valve 20 to the outlet 26 will cause the valve member 36 to be rotated about the hinge pin 38 to a position as shown by dash lines in FIG. 1. When the valve member 36 is in this position, it can be seen that the flow path through the check valve 20 and through the aperture 32 therein is completely unrestricted. Upon cessation of flow through the check valve 20, the valve member 36 will gravitate to the position illustrated by solid lines in FIG. 1. In this latter position of the valve member 36, a fluid tight seal is formed upon contact between the pressure responsive bead 48 and the surface 34 of the seat 30. It should be pointed out that the seal formed by this contact will be highly effective, even at low differential pressures existing across the check valve 20 from the outlet 26 to the inlet 24. Should such differential pressures increase, the force resulting therefrom will move the seal portion 42 of the valve member 36 toward the inlet 24 of the check valve 20 until the reinforcing members 46 come into contact with the surface 34 of the seat 30. Such contact prevents further movement of the seal portion 42 and at the same time deforms the pressure responsive bead 48 outwardly as shown in FIG. 5. It can be seen by observing FIG. 5 that further increases in pressure will augment the fluid tight seal because of the entrapment of the bead 48 by the reinforcing members 46 and the surface 34 of the seat 30.

It should also be pointed out that the construction of the hinge portion 44 from a resilient material reduces the accuracy to which the alignment between the hinge pin 38 and the seating surface 34 must be held. The advantage thus gained is due to the ability of the resilient hinge portion 44 to flex, thus providing a self-aligning feature to the seal portion 42 depending therefrom.

Figure 6:
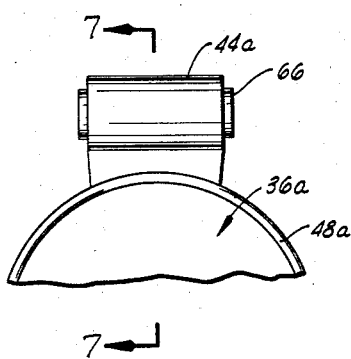
FIG. 6 is a partial elevation view, illustrating a slightly modified valve member.
Figure 7:
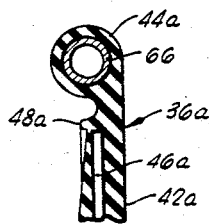
FIG. 7 is a cross-sectional view of the valve member shown in FIG. 6 taken along the line 7—7 of FIG. 6.

A slightly modified valve member 36a is illustrated in FIGS. 6 and 7. The valve member 36a is in all respects, except for the construction of the hinge portion 44a, identical to the valve member 36 as described in connection with FIGS. 1, 2 and 3. A reinforcing sleeve 66 is molded in the hinge portion 44a. The reinforcing sleeve 66 will make the hinge portion 44a more rigid and in addition will provide a bearing surface between the hinge portion 44a and the hinge pin utilized to retain the valve member 36a in the check valve. It should be pointed out that the reinforcing sleeve 66, while making the hinge portion 44a more rigid, will not interfere with the folding characteristic of the valve member 36a.

Figures 8, 9:
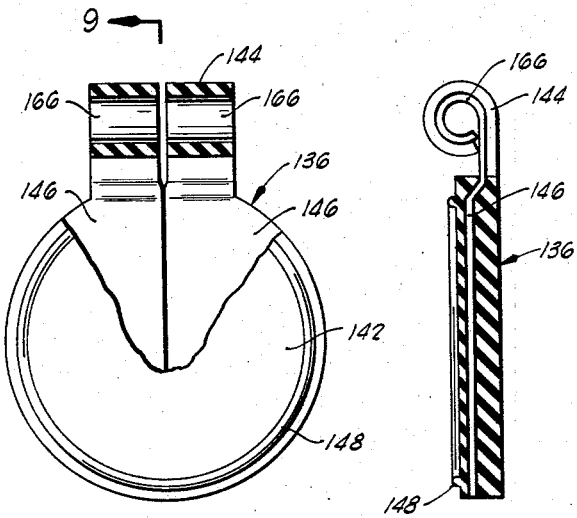
FIG. 8 is an elevation view, partly in cross-section, illustrating another form of structure in a valve member; and, FIG. 9 is a cross-sectional view of the valve member shown in FIG. 8 taken along the line 9—9 of FIG. 8.

FIGS. 8 and 9 illustrate another embodiment of a valve member which is generally designated by the reference character 136. As illustrated, the valve member 136 includes a seal portion 142 and a hinge portion 144. The seal portion 142 includes a pair of segmental reinforcing members 146 having adjacent chords in a manner similar to the reinforcing members 46 of the valve member 36.

As may be clearly seen in FIG. 8, the reinforcing members 146 are also provided with a pair of arms 166 which extend from the reinforcing members 146 into the hinge portion 144. The arms 166 are formed so that the outer end thereof is adapted to encircle a portion of the hinge pin 38 when the valve member 136 is installed in the check valve 20. The valve member 136 is substantially encompassed by resilient material which is formed into a projecting bead 148. The bead 148 projects outwardly from the inlet side of the valve member 136 and is adapted to engage the surface 34 of the seat 30 of the check valve 20 when the valve member 136 is installed therein.

When using the valve member 136 in connection with the check valve 20, it can be seen that the hinge pin 38 will be encircled by the arms 166 of the reinforcing members 146 and thereby provide a valve member 136 which is more rigid than the valve member 36. The bead 148 has been illustrated to show that various forms of seal structure can be utilized in connection with the valve members 36, 36a, or 136.

Fluid flowing from the inlet 24 to the outlet 26 of the valve 20 will pivot the valve member 136 about the hinge pin 38 to a position similar to that shown in dash lines in FIG. 1. Cessation of fluid flow through the valve 20 will permit the valve member 136 to gravitate to a position wherein the bead 148 is in contact with the surface 34 of the seat 30. Contact between the bead 148 and the surface 34 forms a fluid tight seal therebetween, preventing flow from the outlet 26 to the inlet 24. Pressure applied to the valve member 136 from the outlet 26 of the check valve 20 will cause the bead 148 to be deformed into the resilient material encompassing the valve member 136, but in a manner different to that described in connection with the pressure responsive bead 48. Due to the location of the bead 148, the reinforcing members 146 cannot be brought into contact with the surface 34 of the seat 30. The bead 148, which is positioned between the surface 34 and the reinforcing members 146, is subject to being extruded into the aperture 32 when high pressures are applied from the outlet 26 of the check valve 20. While the form of seal used in connection with the valve member 136 will provide effective low pressure seals, it should be pointed out that extremely high pressures will cause a seal failure and, for this reason, the pressure responsive bead 48 is a more desirable seal form.

It should be apparent from the foregoing that a check valve constructed in accordance with the invention can be manufactured easily and very economically due to the fact that the valve member 36 can be molded in one operation. Another feature contributing to the economical manufacture of the valve is the folding characteristic of the valve member which eliminates the requirement for a bonnet opening and cover. Also, the structure of the valve body will be substantially increased in strength due to the elimination of the bonnet opening and, therefore, the overall weight and dimensions of the check valve can be reduced. Obviously elimination of the threaded connection between the bonnet opening and the cover therefor will necessarily eliminate many of the sealing problems present in currently available full bore check valves. It should also be apparent that the check valve of this invention provides a full bore or full opening check valve which does not require the bonnet opening for insertion of the valve member. Another very important feature of the invention is the provision of the foldable valve member which, even though incorporating the folding characteristic, can withstand the application of relatively high pressures.

It should also be pointed out that the embodiments described herein are presented by way of example only and that many modifications and changes can be made therein without departing from the spirit of the invention or from the scope of the annexed claims.

What I claim is:
1. A check valve comprising:
   a valve body having an inlet and an outlet communicating with a chamber formed in said body;
   an annular seat in said chamber extending along a substantially vertical plane and having an aperture extending therethrough;
   said aperture having a flow area at least equal to the area of said outlet;
   a hinge pin secured in the valve body to extend across the chamber above said seat;
   a valve member pivotally mounted on said hinge pin and adapted to engage said seat to close said aperture, said valve member being constructed from a mass of resilient material and having a sealing portion and a hinge portion extending radially outwardly from said sealing portion; and
   a re-inforcing sleeve molded in said hinge portion forming a bearing around said hinge pin, said re-inforcing sleeve having a length substantially less than the diameter of said outlet;
   said sealing portion including a pair of rigid segmental reinforcing members sized to extend across said aperture and engage opposed portions of said seat, said reinforcing members being arranged whereby the chords thereof are adjacent;
   said reinforcing members being retained in a common plane when engaged with said seat and said sealing portion being foldable along a line defined by the adjacent chords of said reinforcing members whereby said valve member can be inserted into said chamber through the outlet thereof.

2. A check valve as defined in claim 1 wherein the thickness of said resilient material in said sealing portion is increased along the folding line of said sealing portion.

3. A check valve comprising:
   a valve body having an inlet and an outlet communicating with a chamber formed in said body;
   an annular seat in the inlet end of said chamber extending along a substantially vertical plane and having an aperture extending therethrough;
   a hinge pin secured in the valve body to extend across the chamber above said seat;
   a valve member pivotally mounted on said hinge pin and having a sealing portion constructed of resilient material;
   said sealing portion including a pair of rigid reinforcing members disposed in edge-adjacent relationship and said sealing portion being engageable with said seat to close said aperture;
   said valve member having said reinforcing members arranged in a common plane when said valve member is in engagement with said seat and being foldable along a line defined by the adjacent edges of said reinforcing members when off said seat, whereby said valve member can be inserted into said valve body through the inlet or outlet end thereof; and,
   said reinforcing members each having an arm portion extending therefrom arranged in parallel spaced relation and bent to encircle said hinge pin to pivotally support the valve member in said chamber.

4. A check valve member to be pivotally supported on a hinge pin, comprising:
   a mass of resilient material molded into a disc-shaped sealing portion and a radially extended hinge portion;
   a pair of rigid reinforcing members of substantially semi-circular configuration embedded in said sealing portion with the chords thereof adjacent; and
   a reinforcing sleeve embedded in said hinge portion on an axis parallel with the plane of said sealing portion for rotatably receiving the hinge pin and pivotally supporting the check valve member on the hinge pin, said re-inforcing sleeve having a length less than the diameter of said sealing portion.

5. A check valve member to be pivotally supported on a hinge pin, comprising:
   a mass of resilient material molded into a disc-shaped sealing portion and a radially extended hinge portion;
   a pair of rigid reinforcing members of substantially semi-circular configuration embedded in said sealing portion with the chords thereof adjacent; and
   arms extended from said reinforcing members in parallel relation through said hinge portion, the outer end portions of said arms being bent to encircle the hinge pin and pivotally support the check valve member on the hinge pin.

References Cited by the Examiner

UNITED STATES PATENTS

| 2,397,269 | 3/1946 | Kelly | 137—516.29 |
| 2,730,115 | 1/1956 | Kempel | 137—525.7 X |
| 2,859,771 | 11/1958 | Blagg | 137—512.15 |
| 2,882,923 | 4/1959 | Smolensky | 137—515.5 |
| 3,042,290 | 7/1962 | Fraebel | 137—512.15 X |
| 3,058,487 | 10/1962 | Helling | 137—525 X |
| 3,128,785 | 4/1964 | Krummel | 137—525.3 X |

WILLIAM F. O'DEA, *Primary Examiner.*

HAROLD WEAKLEY, *Examiner.*